United States Patent
Lee et al.

(10) Patent No.: US 10,153,484 B2
(45) Date of Patent: Dec. 11, 2018

(54) ANODE ACTIVE MATERIAL AND METHOD OF PREPARING THE SAME

(71) Applicant: LG Chem, Ltd., Seoul (KR)

(72) Inventors: Yong Ju Lee, Daejeon (KR); Jun Sik Ham, Seongnam-Si (KR); Sung Man Lee, Chuncheon-Si (KR); Rae Hwan Jo, Daejeon (KR); Eun Kyung Kim, Daejeon (KR); Je Young Kim, Daejeon (KR); Hong Kyu Park, Daejeon (KR); Jung Woo Yoo, Daejeon (KR); Mi Rim Lee, Daejeon (KR)

(73) Assignee: LG Chem, Ltd. (KR)

( * ) Notice: Subject to any disclaimer, the term of this patent is extended or adjusted under 35 U.S.C. 154(b) by 560 days.

(21) Appl. No.: 14/417,292

(22) PCT Filed: Oct. 29, 2014

(86) PCT No.: PCT/KR2014/010263
§ 371 (c)(1),
(2) Date: Jan. 26, 2015

(87) PCT Pub. No.: WO2015/065047
PCT Pub. Date: May 7, 2015

(65) Prior Publication Data
US 2015/0380733 A1     Dec. 31, 2015

(30) Foreign Application Priority Data

Oct. 31, 2013  (KR) .................. 10-2013-0131637
Oct. 31, 2013  (KR) .................. 10-2013-0131638

(51) Int. Cl.
*H01M 4/36*    (2006.01)
*H01M 4/38*    (2006.01)
(Continued)

(52) U.S. Cl.
CPC ......... *H01M 4/366* (2013.01); *H01M 4/0428* (2013.01); *H01M 4/0471* (2013.01);
(Continued)

(58) Field of Classification Search
CPC ................................................ H01M 10/0525
See application file for complete search history.

(56) References Cited

U.S. PATENT DOCUMENTS

| 5,376,585 A | 12/1994 | Lin et al. |
| 2003/0096168 A1 | 5/2003 | Kasamatsu et al. |

(Continued)

FOREIGN PATENT DOCUMENTS

| CN | 1416600 A | 5/2003 |
| CN | 101044654 A | 9/2007 |

(Continued)

OTHER PUBLICATIONS

Mingyuan Ge et al., Porous Doped Silicon Nanowires for Lithium Ion Battery Anode with Long Cycle Life, Apr. 9, 2012, Nano Letters, vol. 12, No. 5, pp. 2318-2323.
(Continued)

*Primary Examiner* — Ula C Ruddock
*Assistant Examiner* — Thomas H. Parsons
(74) *Attorney, Agent, or Firm* — Lerner, David, Littenberg, Krumholz & Mentlik, LLP (57) ABSTRACT

Provided are a porous silicon-based anode active material including a core part including silicon (Si) and $M_xSi_y$, and a shell part including Si and a plurality of pores on the core part, wherein, in the $M_xSi_y$, M is at least one element selected from the group consisting of Group 2A, 3A, and 4A elements and transition metals, $1 \leq x \leq 4$, and $1 \leq y \leq 4$, and a method of preparing the porous silicon-based anode active material.

According to an embodiment of the present invention, capacity characteristics and lifetime characteristic of a
(Continued)

lithium secondary battery may be improved by minimizing the volume expansion of an anode active material during charge and discharge.

32 Claims, 7 Drawing Sheets

(51) Int. Cl.
*H01M 4/04* (2006.01)
*H01M 4/46* (2006.01)
*H01M 10/0525* (2010.01)
*H01M 4/134* (2010.01)
*H01M 4/1395* (2010.01)
*H01M 4/62* (2006.01)
*H01M 10/052* (2010.01)

(52) U.S. Cl.
CPC ......... *H01M 4/134* (2013.01); *H01M 4/1395* (2013.01); *H01M 4/364* (2013.01); *H01M 4/386* (2013.01); *H01M 4/387* (2013.01); *H01M 4/466* (2013.01); *H01M 4/625* (2013.01); *H01M 10/0525* (2013.01); *H01M 10/052* (2013.01); *H01M 2220/30* (2013.01)

(56) References Cited

U.S. PATENT DOCUMENTS

| | | | |
|---|---|---|---|
| 2008/0076017 | A1 | 3/2008 | Takezawa et al. |
| 2009/0029256 | A1 | 1/2009 | Mah et al. |
| 2011/0294012 | A1 | 12/2011 | Nakabayashi et al. |
| 2012/0037858 | A1 | 2/2012 | Kim et al. |
| 2012/0100438 | A1 | 4/2012 | Fasching et al. |
| 2012/0219860 | A1 | 8/2012 | Wang et al. |
| 2012/0328943 | A1 | 12/2012 | Mah et al. |
| 2013/0011736 | A1* | 1/2013 | Loveness ............ H01M 4/0492 429/212 |
| 2013/0071750 | A1 | 3/2013 | Park et al. |
| 2013/0189575 | A1 | 7/2013 | Anguchamy et al. |
| 2013/0234073 | A1 | 9/2013 | Kim et al. |

FOREIGN PATENT DOCUMENTS

| | | |
|---|---|---|
| CN | 102263231 A | 11/2011 |
| CN | 102272983 A | 12/2011 |
| CN | 102668100 A | 9/2012 |
| JP | 2004-214054 A | 7/2004 |
| JP | 2004-356054 A | 12/2004 |
| JP | 2011-249173 A | 12/2011 |
| JP | 2012-514305 A | 6/2012 |
| JP | 2013069674 A | 4/2013 |
| KR | 20020080467 A | 10/2002 |
| KR | 2007-0069188 A | 7/2007 |
| KR | 2008-0019801 A | 3/2008 |
| KR | 2010-0080479 A | 7/2010 |
| KR | 2012-0010211 A | 2/2012 |
| KR | 20130016727 A | 2/2013 |
| KR | 1020130016727 * | 2/2013 |
| WO | 2012054766 A2 | 4/2012 |

OTHER PUBLICATIONS

Zhou, S. et al., Si/TiSl2 Heteronanostructures as High-Capacity Anode Material for Li Ion Batteries, Feb. 11, 2010, Nano Letters, vol. 10, No. 3, pp. 860-863.
Chinese Office Action and Search Report for Application No. 201480002569.X dated Jun. 28, 2016.
Extended European Search Report for EP Application No. 14833330.5 dated Aug. 17, 2016.
International Search Report from PCT/KR2014/010263, dated Nov. 28, 2015.

* cited by examiner

ANODE ACTIVE MATERIAL AND METHOD OF PREPARING THE SAME

CROSS-REFERENCE TO RELATED APPLICATION

This application is a national phase entry under 35 U.S.C. § 371 of International Application No. PCT/KR2014/010263, filed Oct. 29, 2014, which claims priority to Korean Patent Application No. 10-2013-0131637, filed Oct. 31, 2013 and Korean Patent Application No. 10-2013-0131638, filed Oct. 31, 2013, the disclosures of which are incorporated herein by reference.

TECHNICAL FIELD

The present invention relates to a porous silicon-based anode active material for a lithium secondary battery and a method of preparing the same.

BACKGROUND ART

Lithium secondary batteries, which are recently in the spotlight as a power source of portable and small electronic devices, may exhibit high discharge voltages that are two times or more than those of batteries using a typical alkaline aqueous solution by using an organic electrolyte solution. Thus, the lithium secondary batteries exhibit high energy density.

Graphite is mainly used as an anode material of the lithium secondary battery. However, graphite has a low capacity per unit mass of 372 mAh/g and a high-capacity lithium secondary battery may be difficult to be prepared by using graphite.

Anode active materials exhibiting higher capacity than graphite, i.e., materials electrochemically forming an alloy with lithium (lithium alloying material), such as silicon, tin, and an oxide thereof, exhibit a high capacity of about 1,000 mAh/g or more and a low charge and discharge potential of 0.3 V to 0.5 V, and thus, these materials are in the spot light as an anode active material for a lithium secondary battery.

However, volumes of these materials may expand because crystal structures thereof may be changed when electrochemically forming an alloy with lithium. In this case, since loss due to physical contact between active materials or active material and current collector of an electrode, which is prepared by coating with powder, occurs during charge and discharge, capacity of a lithium secondary battery may significantly decrease as charge and discharge cycles are repeated.

Also, in order to prevent volume expansion and improve lifetime characteristics when a silicon-based anode active material is used, research into the formation of pores on the surface and inside of the silicon-based anode active material has been conducted. However, there may be difficulty in having a desired performance of the battery by adjusting pore size, uniformity, and degree of porosity on the surface and inside of the silicon-based anode active material.

Thus, in order to increase the capacity of the lithium secondary battery, there is a need to develop a novel silicon-based material capable of effectively controlling the volume change. The novel silicon-based material allows the pore size, uniformity, and degree of porosity on the surface and inside of the silicon-based anode active material to be adjusted to satisfy capacity, efficiency, and cycle lifetime characteristics of the secondary battery, and thus, the novel silicon-based material may replace a typical anode active material.

DISCLOSURE OF THE INVENTION

Technical Problem

The present invention is provided to solve the above-described problems.

The present invention provides a porous silicon-based anode active material which may improve capacity characteristics and lifetime characteristic of a lithium secondary battery by minimizing the volume expansion of the anode active material during charge and discharge.

The present invention also provides a method of preparing the porous silicon-based anode active material capable of controlling pore size, uniformity, and internal porosity of the anode active material.

The present invention also provides an anode and a lithium secondary battery including the porous silicon-based anode active material.

Technical Solution

According to an aspect of the present invention, there is provided a porous silicon-based anode active material including: a core part including silicon (Si) and $M_xSi_y$ (metal silicide); and a shell part including Si and a plurality of pores on the core part, wherein, in the $M_xSi_y$, M is at least one element selected from the group consisting of Group 2A, 3A, and 4A elements and transition metals, $1 \leq x \leq 4$, and $1 \leq y \leq 4$.

According to another aspect of the present invention, there is provided a method of preparing an anode active material including: preparing Si-$M_xSi_y$ alloy powder by using metal (M) and Si; and preparing porous silicon-based particles by removing $M_xSi_y$ (metal silicide) through etching by mixing and stirring the Si-$M_xSi_y$ alloy powder with an etching solution, wherein, in the $M_xSi_y$, M is at least one element selected from the group consisting of Group 2A, 3A, and 4A elements and transition metals, $1 \leq x \leq 4$, and $1 \leq y \leq 4$.

According to another aspect of the present invention, there is provided an anode and a lithium secondary battery including the porous silicon-based anode active material.

Advantageous Effects

According to an embodiment of the present invention, capacity characteristics and lifetime characteristic of a lithium secondary battery may be improved by minimizing the volume expansion of an anode active material during charge and discharge.

Also, according to a method of preparing a porous silicon-based anode active material according to an embodiment of the present invention, since the depth of pore formation, the diameter of pore, and internal porosity may be controlled by adjusting etching conditions of a Si-$M_xSi_y$ alloy in which a $M_xSi_y$ (metal silicide) phase and a silicon (Si) phase are uniformly distributed, a porous silicon-based anode active material, which includes a core part including the Si-$M_xSi_y$ alloy; and a shell part including Si and a plurality of pores, may be easily prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A porous silicon-based anode active material according to an embodiment of the present invention may include a core part including silicon (Si) and $M_xSi_y$ (metal silicide); and a shell part including Si and a plurality of pores on the core part, wherein, in the $M_xSi_y$, M is at least one element selected from the group consisting of Group 2A, 3A, and 4A elements and transition metals, $1 \leq x \leq 4$, and $1 \leq y \leq 4$, unless otherwise specified in the present specification.

Also, the anode active material according to the embodiment of the present invention may further include a carbon coating layer on the shell part.

In the case that the silicon-based anode active material is used in a lithium secondary battery, lithium moves from a cathode to an anode when the lithium secondary battery is charged, and in this case, lithium may be alloyed with Si constituting the porous silicon-based active material in the anode. Volume expansion of Si may occur due to the alloying. Also, during discharge, lithium is deintercalated from Si to move toward the cathode. Si in the state of expansion may shrink to its original volume due to the deintercalation. Thus, the expansion and contraction of Si may occur as the charge and discharge of the lithium secondary battery are repeated.

Since the anode active material according to the embodiment of the present invention includes Si and the plurality of pores in the shell part, capacity characteristics due to Si as well as lifetime characteristics of the lithium secondary battery may be simultaneously improved by minimizing the volume expansion of the anode active material during charge and discharge due to the pores. In addition, since the pores may be impregnated with a non-aqueous electrolyte solution, lithium ions may be introduced into the inside of the anode active material. Thus, the diffusion of lithium ions may effectively occur to allow high rate charge and discharge.

Also, since the anode active material of the present invention includes Si and $M_xSi_y$ in the core part, an $M_xSi_y$ layer may act as a core to support porous Si included in the shell part. Thus, physical properties and mechanical properties may be improved.

Furthermore, since the anode active material of the present invention includes the carbon coating layer on the shell part, difficulties in the electrical contact between particles due to the presence of the plurality of pores in the shell part may be addressed. Since the anode active material of the present invention provides excellent electrical conductivity even after the electrode expands as the charge and discharge proceed, the performance of the lithium secondary battery may be further improved.

In the anode active material according to the embodiment of the present invention, the core part may form an alloy in which two main phases of Si and $M_xSi_y$ (metal silicide) are present. That is, the Si phase and $M_xSi_y$ phase are included as two or more different phases in the core part and these two phases may be uniformly distributed and included.

In the core part including Si and $M_xSi_y$, M may be at least one element selected from the group consisting of tin (Sn), aluminum (Al), lead (Pb), indium (In), nickel (Ni), cobalt (Co), silver (Ag), magnesium (Mg), copper (Cu), germanium (Ge), chromium (Cr), titanium (Ti), manganese (Mn), vanadium (V), molybdenum (Mo), and iron (Fe), and for example, may be at least one element selected from the group consisting of Ni, Cu, Ti, and Fe.

Also, a weight ratio of M:Si in the $M_xSi_y$ is in a range of 1:0.5 to 1:10, and may be in a range of 1:1 to 1:5. In the case that an amount of M is greater than the above range, since the amount of formable pores may be small, the suppression of the volume expansion may be difficult. In the case in which the amount of M is less than the above range, an intermetallic compound between Si and M is excessively formed, and thus, a large amount of pores may be formed to destroy the particles during anode processing, or capacity may decrease when a small amount of pores is formed by light etching.

In the anode active material according to the embodiment of the present invention, the shell part may be formed on the core part and may include Si and a plurality of pores. In the shell part, an average diameter of the pores is in a range of 10 nm to 2 μm, for example, 20 nm to 1 μm, as measured on the surface thereof. The diameter of the pores, for example, may be measured using scanning electron microscope (SEM) images.

An internal porosity of the shell part may be in a range of 20% to 80%. Since the Si volume expansion may be sufficiently absorbed by the plurality of pores included in the anode active material of the present invention, the volume expansion may be minimized.

According to an embodiment of the present invention, the internal porosity of the shell part may be defined below:

Internal porosity=volume of pores per unit mass/
(specific volume+volume of pores per unit
mass).

The measurement of the internal porosity is not particularly limited. According to an embodiment of the present invention, the internal porosity, for example, may be measured by using absorption gas, such as nitrogen, and BELSORP (BET instrument) by BEL Japan, Inc.

Also, according to an embodiment of the present invention, the shell part may further include a trace amount of $M_xSi_y$, wherein M is at least one element selected from the group consisting of Group 2A, 3A, and 4A elements and transition metals, $1 \leq x \leq 4$, and $1 \leq y \leq 4$.

In the anode active material according to the embodiment of the present invention, the carbon coating layer may have a curved portion along an uneven surface of the shell part which is formed by the pores of the shell part. That is, the carbon coating layer is thinly formed along the outline of the shell part to form a coating layer, and thus, the electrical contact between the particles may be improved while maintaining the appearance of the shell part. Also, since the carbon coating layer may provide excellent electrical conductivity even after the electrode expands as the charge and discharge proceed, the performance of the lithium secondary battery may be further improved.

A thickness of the carbon coating layer is in a range of 5 nm to 500 nm and may be in a range of 5 nm to 100 nm. In the case that the thickness of the carbon coating layer is less than 5 nm, an effect of increasing electrical conductivity due to the carbon coating layer may be insignificant and the reactivity with the electrolyte solution during the application of the anode active material may be high. Thus, initial efficiency may be reduced. In the case in which the thickness of the carbon coating layer is greater than 500 nm, since the thickness of the carbon coating layer may be excessively increased to act as a barrier to the mobility of lithium ions, resistance may increase.

In the anode active material according to the embodiment of the present invention, an amount of carbon included in the carbon coating layer is in a range of 2 wt % to 70 wt %, may be in a range of 5 wt % to 50 wt %, and for example, may be in a range of 5 wt % to 40 wt % based on a total weight of the anode active material.

In the case that the amount of carbon is greater than 70 wt %, since a thick coating layer may be formed due to the excessive amount of carbon, an additional irreversible reaction may occur to significantly reduce discharge capacity. In contrast, in the case in which the amount of carbon is less than 2 wt %, since the carbon coating layer is excessively thin, the desired effect of the improvement of the electrical conductivity of the present invention may be insignificant. Also, since an additional irreversible reaction occurs due to the conductive coating layer, the discharge capacity may be significantly decreased.

Also, in the anode active material according to the embodiment of the present invention, a volume ratio of the core part to the shell part is in a range of 1:1 to 1:20 and for example, may be in a range of 1:2 to 1:10.

In the case that the ratio of the core part is greater than the above range, since the formation of the pore structure is insufficient, volume expansion may not be sufficiently suppressed and lifetime characteristics may degrade. In contrast, in the case in which the ratio of the core part is less than the above range, mechanical strength of the powder may be decreased due to excessive pore formation.

Also, an average particle diameter ($D_{50}$) of the anode active material according to the embodiment of the present invention is in a range of 0.1 μm to 50 μm, and may be in a range of 0.5 μm to 20 μm.

In the case that the average particle diameter of the anode active material is less than 0.1 μm, the anode active material may be difficult to be dispersed in an anode active material slurry or may agglomerate in the electrode. In the case in which the average particle diameter of the anode active material is greater than 50 μm, since the uniform reaction between lithium and the active material may be difficult, the lifetime characteristics and characteristics of suppressing the thickness expansion may be significantly reduced.

In the present invention, the average particle diameter of the particles may be defined as a particle diameter at 50% in a cumulative particle diameter distribution. For example, the average particle diameter ($D_{50}$) of the particles according to the embodiment of the present invention may be measured by using a laser diffraction method. The laser diffraction method may generally measure a particle diameter ranging from a submicron level to a few mm, and may obtain highly repeatable and high resolution results.

A specific surface area (BET-SSA) of the anode active material according to the embodiment of the present invention may be in a range of 2 $m^2/g$ to 80 $m^2/g$. In the case that a lithium secondary battery is prepared by using an anode active material satisfying the above specific surface area range, rate characteristics of the lithium secondary battery may be improved.

In the case that the specific surface area is greater than 80 $m^2/g$, a side reaction with an electrolyte solution may be difficult to be controlled due to the wide specific surface area. In the case in which the specific surface area is less than 2 $m^2/g$, sufficient pores may not be formed, and thus, the volume expansion during the charge and discharge of the lithium secondary battery may not be effectively accommodated.

According to an embodiment of the present invention, the specific surface area of the anode active material may be measured by a Brunauer-Emmett-Teller (BET) method. For example, the specific surface area may be measured by a 6-point BET method according to a nitrogen gas adsorption-flow method using a porosimetry analyzer (Belsorp-II mini by Bell Japan Inc.).

The present invention may also provide a method of preparing the anode active material.

According to an embodiment of the present invention, there is provided a method of preparing a porous silicon-based anode active material including: preparing Si-$M_xSi_y$ alloy powder by using metal (M) and Si (step (i)); and removing $M_xSi_y$ (metal silicide) through etching by mixing and stirring the Si-$M_xSi_y$ alloy powder with an etching solution (step (ii)), wherein, in the $M_xSi_y$, M is at least one element selected from the group consisting of Group 2A, 3A, and 4A elements and transition metals, and $1 \leq x \leq 4$, and $1 \leq y \leq 4$.

According to the preparation method according to the embodiment of the present invention, since the Si-$M_xSi_y$ alloy powder, in which the $M_xSi_y$ (metal silicide) phase and the Si phase are uniformly distributed, may be formed and the depth of pore formation, the diameter of pore, and internal porosity may be controlled by etching the Si-$M_xSi_y$ alloy powder by adjusting etching conditions, a porous silicon-based anode active material including the core part and the shell part may be prepared.

Figure 1:
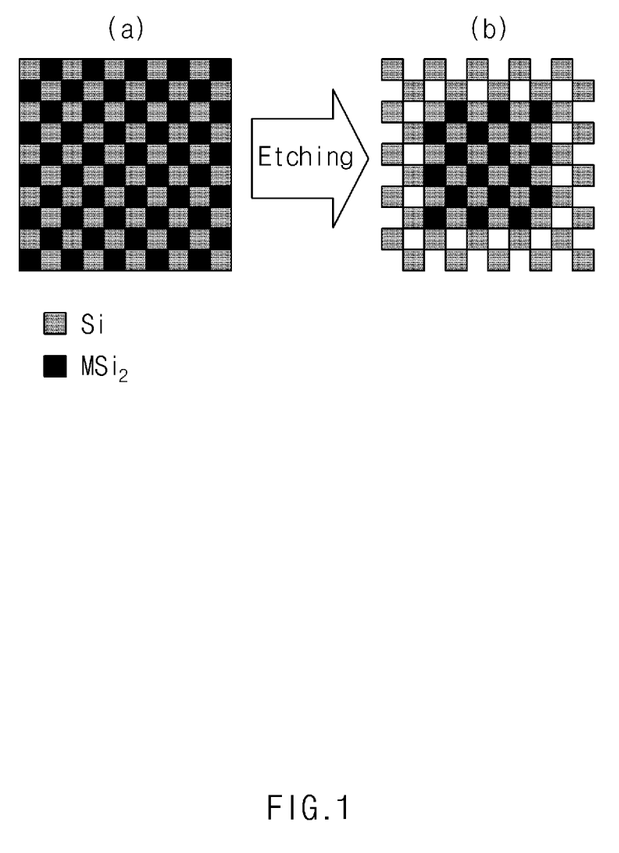
FIG. 1 is a schematic view illustrating an example of a method of preparing a porous silicon-based anode active material according to an embodiment of the present invention.

FIG. 1 is a schematic cross-sectional view illustrating a method of preparing a porous silicon-based anode active material according to an embodiment of the present invention, that is, an example of a method of forming pores constituting a porous silicon-based anode active material by etching.

That is, FIG. 1(a) may be a step of preparing Si-$M_xSi_y$ alloy powder by using metal (M) and Si according to step (i), and FIG. 1(b) may be a step of forming pores in the $M_xSi_y$ by removing $M_xSi_y$ through etching by mixing and stirring the Si-$M_xSi_y$ alloy powder with an etching solution.

Also, the preparation method according to an embodiment of the present invention may include: preparing Si-$M_xSi_y$ alloy powder by using metal (M) and Si (step (i)); preparing porous silicon-based particles by removing $M_xSi_y$ through etching by mixing and stirring the Si-$M_xSi_y$ alloy powder with an etching solution (step (ii)); and forming a carbon coating layer on surfaces of the porous silicon-based particles (step (iii)).

Specifically, step (i) may be a step of preparing Si-$M_xSi_y$ alloy powder by using metal (M) and Si.

In the method of preparing an anode active material according to the embodiment of the present invention, the Si-$M_xSi_y$ alloy powder may be prepared by two methods.

A first preparation method of the Si-$M_xSi_y$ alloy powder may be a method of preparing Si-$M_xSi_y$ alloy powder by rapid cooling an alloy melt in which metal (M) and Si are melted.

The alloy melt includes Si and M, at least one element, preferably, at least one element selected from the group consisting of Group 2A, 3A, and 4A elements and transition metals, more preferably, at least one element selected from the group consisting of Sn, Al, Pb, In, Ni, Co, Ag, Mn, Cu, Ge, Cr, Ti, Mn, V, Mo, and Fe, and the alloy melt, for example, may be obtained by simultaneously melting one or an alloy thereof by a high frequency induction heating method. The melting may be performed in a temperature range of room temperature to 1,600° C.

According to an embodiment of the present invention, a weight ratio of element M:Si in the alloy melt is in a range of 1:0.5 to 1:10, for example, 1:1 to 1:5. In the case that the amount of the element M in the alloy melt is outside the above range, the amount of the element M is decreased so that the amount of pores may be decreased, or the amount of the element M is excessive so that the pore structure may not be maintained and collapsed during a process of forming pores.

Examples of the method of rapidly cooling the alloy melt may include a gas atomization method of rapidly cooling by gas jet during the injection of a molten alloy, a gas-water atomization method of spaying a molten alloy into water, and a centrifugal atomization method using a centrifugal force in which an alloy is formed as an electrode and the rotating electrode material is rapidly solidified by being melted and vaporized by spark discharge. Also, a method of forming ribbons and filaments may include a method of spray cooling a molten alloy onto a spinning roll, which includes single roll melt spinning using a single roll and twin roller melt spinning using twin rolls, and a splat quenching method in which a molten metal is cooled between facing metal plates.

According to an embodiment of the present invention, the rapid cooling may be performed at a rate of $10^3$ K/sec to $10^9$ K/sec. In the case that the rapid cooling rate is less than $10^3$ K/sec, the sizes of the Si and $M_xSi_y$ phases may be increased, and in the case in which the rapid cooling rate is greater than $10^9$ K/sec, the process may not be easily performed.

According to an embodiment of the present invention, in step (i), Si-$M_xSi_y$ alloy powder, in which a Si phase and a $M_xSi_y$ phase are uniformly distributed, may be obtained by a rapid cooling method. Since the $M_xSi_y$ phase and the Si phase are uniformly distributed in the Si-$M_xSi_y$ alloy powder, the core part formed by the rapid cooling method may significantly affect the improvement of the cycle characteristics of the electrode.

The reason for obtaining the uniform phase distribution by the rapid cooling method is that, according to nucleation-growth theory as a crystal growth mechanism, the higher the cooling rate is, the higher the driving force of nucleation is, and thus, fine crystal nuclei are uniformly formed in the entire phase to relatively suppress crystal growth.

Also, according to an embodiment of the present invention, step (i) may further include mechanical milling between the rapid cooling and the etching, after the rapid cooling of the prepared Si-$M_xSi_y$ alloy powder.

That is, since there is a limitation in decreasing the size of each crystalline phase even if the Si-$M_xSi_y$ alloy powder is prepared by the rapid cooling, mechanical milling may be performed by a typical milling method in order to obtain Si-$M_xSi_y$ alloy powder having more uniform and finer phase distribution. Examples of the mechanical milling may include SPEX milling, planetary milling, attrition milling, magneto-ball milling, and vibration milling, but the present invention is not limited thereto.

A second preparation method of the Si-$M_xSi_y$ alloy powder may be a method of preparing Si-$M_xSi_y$ alloy powder by mechanical milling metal (M) and Si.

The Si-$M_xSi_y$ alloy powder obtained in step (i) may be alloy powder in which the entire structure is an amorphous phase, or alloy powder in which a portion is an amorphous phase and the rest is a crystalline phase formed of fine crystallites, or alloy powder in which the entire structure is a crystalline phase formed of fine crystallites.

step (ii) may be a step of preparing porous silicon-based particles by removing $M_xSi_y$ through etching by mixing and stirring the Si-$M_xSi_y$ alloy powder with an etching solution.

In the preparation method according to the embodiment of the present invention, step (ii) may further include performing a heat treatment before the etching of the Si-$M_xSi_y$ alloy powder with an etching solution. In particular, in the case that mechanical milling is performed in step (i), it is desirable to perform a heat treatment between the mechanical milling and the etching.

The heat treatment may be additionally performed to further coarsen the structure of the Si-$M_xSi_y$ alloy powder. In the case that the heat treatment is additionally performed, the heat treatment may be performed in a temperature range of about 500° C. to about 800° C. According to an embodiment of the present invention, the higher the heat treatment temperature is, the coarser the structure of the Si-$M_xSi_y$ alloy powder may be. In the case that the structure is coarse, large pores may be formed by etching.

The etching solution may include at least one solution selected from the group consisting of hydrogen fluoride (HF), fluorosilicic acid ($H_2SiF_6$), ammonium fluoride ($NH_4F$), hydrochloric acid, sulfuric acid, phosphoric acid and nitric acid.

Since $M_xSi_y$ is removed by the etching, a pore may be formed in a portion from which the $M_xSi_y$ is removed.

According to an embodiment of the present invention, the removal of the $M_xSi_y$, i.e., the degree of the pore formation, may be controlled according to etching time and a concentration of the etching solution.

According to an embodiment of the present invention, the $M_xSi_y$ may be removed from the surface of the anode active material by the etching solution.

According to an embodiment of the present invention, pores may be formed in portions from which the $M_xSi_y$ is removed, and thus, a shell part including Si and the plurality of pores may be formed. Also, portions, in which pores are not formed because the $M_xSi_y$ is not removed, may form a core part including Si and $M_xSi_y$.

According to an embodiment of the present invention, in order to prepare an anode active material having a volume ratio of the core part to the shell part of 1:1 to 1:20, the concentration of the etching solution may be in a range of 1M to 20 M, and the etching time may be in a range of 30 minutes to 1,000 minutes.

Also, for example, in order to prepare an anode active material having the volume ratio of the core part to the shell part of 1:2 to 1:10, the concentration of the etching solution may be in a range of 1M to 5 M, and the etching time may be in a range of 60 minutes to 600 minutes.

The longer the etching time is, the relatively larger the volume of the shell part in the anode active material may be. The shorter the etching time is, the relatively smaller the volume of the shell part may be.

Since the formed pores may have a very small average particle diameter and the pores as well as Si may be overall uniformly distributed, it is possible to expand while compressing the volume of pores when Si is alloyed with lithium to cause volume expansion. Thus, porous particles, which remain almost unchanged in appearance, may be prepared.

Step (iii) may be a step of forming a carbon coating layer on surfaces of the porous silicon-based particles.

The carbon coating layer may be formed by mixing the porous silicon-based particles with a carbon precursor and then heat treating the mixture.

Any carbon precursor may be used without limitation so long as it may form carbon by a heat treatment, and for example, the amorphous carbon or the low crystalline carbon may include gas including carbon, amorphous carbon, or low crystalline carbon. Specifically, the carbon precursor may include any one selected from the group consisting of saccharides such as glucose, fructose, galactose, maltose, lactose, and sucrose; resins such as a phenol-based resin, a naphthalene resin, a polyvinyl alcohol resin, an urethane resin, a polyimide resin, a furan resin, a cellulose resin, an epoxy resin, a polystyrene resin, a resorcinol-based resin, and a phloroglucinol-based resin; a coal-derived pitch, a petroleum-derived pitch, a tar, and low molecular weight heavy oil, or a mixture of two or more thereof.

For example, the carbon coating layer may be formed by a method of carburizing the amorphous carbon precursor. A dry or wet coating method may be used as the coating method. Also, a deposition method, for example, a chemical vapor deposition (CVD) method that uses gas including carbon, such as methane, ethane, propane, ethylene, and acetylene, may be used to form the carbon coating layer.

In the method of preparing an anode active material according to the embodiment of the present invention, a heat treatment temperature for forming the carbon coating layer may be in a range of 160° C. to 1,300° C., for example, 300° C. to 1,100° C., and a heat treatment time may be in a range of about 20 minutes to about 20 hours, for example, 30 minutes to 10 hours.

In the case that the heat treatment temperature is less than 160° C., since the temperature is excessively low, a carbon coating layer is difficult to be formed. In the case in which the heat treatment temperature is greater than 1,300° C., since the temperature is excessively high, the crystal structure of a desired compound may be changed or silicon carbide may be formed. Also, the heat treatment, for example, may be performed in an inert atmosphere including nitrogen gas, argon gas, helium gas, krypton gas, or xenon gas.

The present invention may also provide an anode including the anode active material.

The anode according to an embodiment of the present invention may include the anode active material that is mixed with a typically used anode active material. For example, a carbon-based material or lithium metal oxide, which is typically capable of intercalating and deintercalating lithium ions, may be used. Preferably, the carbon-based material may be used and as the carbon-based material, both low crystalline carbon and high crystalline carbon may be used. The carbon-based material may include at least one selected from the group consisting of natural graphite, artificial graphite, soft carbon, hard carbon, mesocarbon microbeads (MCMB), carbon fibers, and carbon black.

Furthermore, the present invention may provide a lithium secondary battery including a cathode, an anode, a separator disposed between the cathode and the anode, and an electrolyte in which a lithium salt is dissolved, wherein the anode includes an anode active material.

The anode active material thus prepared may be used to prepare an anode by a typical method in the art. For example, the anode active material according to the embodiment of the present invention is mixed with a binder, a solvent, and a conductive agent and a dispersant if necessary, and stirred to prepare a slurry. Then, a current collector may be coated with the slurry and pressed to prepare an anode.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with Li, sodium (Na), and Ca, or various copolymers, may be used as the binder. N-methyl pyrrolidone, acetone, or water may be used as the solvent.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous-based dispersant or an organic dispersant, such as N-methyl-2-pyrrolidone, may be used as the dispersant.

Similar to the preparation of the anode, a cathode active material, a conductive agent, a binder, and a solvent are mixed to prepare a slurry, and a cathode may then be prepared by directly coating a metal current collector with the slurry or by casting the slurry on a separate support and laminating a cathode active material film separated from the support on a metal current collector.

Examples of the cathode active material may be a layered compound, such as lithium cobalt oxide ($LiCoO_2$), lithium nickel oxide ($LiNiO_2$), $Li[Ni_xCo_yMn_zM_v]O_2$ (where M is any one selected from the group consisting of Al, gallium (Ga), and In, or two or more elements thereof; and $0.3 \leq x < 0.1$, $0 \leq y$, $z \leq 0.5$, $0 \leq v \leq 0.1$, and $x+y+z+v=1$), $Li(Li_a M_{b-a-b'}M'_{b'})O_{2-c}A_c$ (where $0 \leq a \leq 0.2$, $0.6 \leq b \leq 1$, $0 \leq b' \leq 0.2$, and $0 \leq c \leq 0.2$; M includes Mn and at least one selected from the group consisting of Ni, Co, Fe, Cr, V, Cu, zinc (Zn), and Ti; M' is at least one selected from the group consisting of Al, Mg, and boon (B); and A is at least one selected from the group consisting of phosphorous (P), fluorine (F), sulfur (S), and nitrogen (N)), or a compound substituted with at least one transition metal; lithium manganese oxides such as the chemical formula $Li_{1+y}Mn_{2-y}O_4$ (where y ranges from 0 to 0.33), $LiMnO_2$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxide represented by the chemical formula $LiNi_{1-y}M_yO_2$ (where M is Co, Mn, Al, Cu, Fe, Mg, B, or Ga, and y ranges from 0.01 to 0.3); lithium manganese complex oxide represented by the chemical formula $LiMn_{2-y}M_y=O_2$ (where M is Co, Ni, Fe, Cr, Zn, or tantalum (Ta), and y ranges from 0.01 to 0.1) or $Li_2Mn_3MO_8$ (where M is Fe, Co, Ni, Cu, or Zn); $LiMn_2O_4$ having a part of Li being substituted with alkaline earth metal ions; a disulfide compound; and $Fe_2(MoO_4)_3$. However, the cathode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers, and a polymer separator base material having at least one surface thereof coated with ceramic may be used. However, the present invention is not limited thereto.

In an electrolyte solution used in an embodiment of the present invention, a lithium salt, which may be included as the electrolyte, may be used without limitation so long as it is typically used in an electrolyte solution for a secondary battery. For example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in an embodiment of the present invention, an organic solvent included in the electrolyte solution may be used without limitation so long as it is typically used in the art. Typically, any one selected from the group consisting of propylene carbonate, ethylene carbonate, diethyl carbonate, dimethyl carbonate, ethylmethyl carbonate, methylpropyl carbonate, dipropyl carbonate, fluoro-ethylene carbonate, dimethyl sulfoxide, acetonitrile, dimethoxyethane, diethoxyethane, vinylene carbonate, sulfolane, γ-butyrolactone, propylene sulfite, tetrahydrofuran, methyl formate, methyl acetate, ethyl acetate, isopropyl acetate, isoamyl acetate, methyl propionate, ethyl propionate, propyl propionate, butyl propionate, methyl butylate, and ethyl butylate, or a mixture of two or more thereof may be used.

In particular, ethylene carbonate and propylene carbonate, ring-type carbonates among the carbonate-based organic solvents, well dissociate the lithium salt in the electrolyte due to high dielectric constants as high-viscosity organic solvents, and thus, the ring-type carbonate may be used. Since an electrolyte having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate, for example, may be used.

Selectively, the electrolyte stored according to the present invention may further include an additive, such as an overcharge inhibitor, that is included in a typical electrolyte.

A separator is disposed between the cathode and the anode to form an electrode assembly, the electrode assembly is put in a cylindrical battery case or prismatic battery case or aluminum pouch, and a secondary battery is then completed when the electrolyte is injected thereinto. Also, the electrode assembly is stacked and impregnated with the electrolyte solution, and a lithium secondary battery is then completed when the product thus obtained is put in a battery case and sealed.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

<Preparation of Anode Active Material>
<Preparation of Porous Silicon-based Anode Active Material>

Example 1

Step (i): Preparing $Si-M_xSi_y$ Alloy Powder Using Metal (M) and Si 24 mol % of high purity Ti powder and 76 mol % of Si were used, and the powders and balls were charged into a SPEX mill filled with argon (Ar) and were milled for 15 hours to prepare Si—$TiSi_2$ alloy powder.

Step (ii): Removing $TiSi_2$ Through Etching by Mixing and Stirring the Si—$TiSi_2$ Alloy Powder with Etching Solution The Si—$TiSi_2$ alloy powder obtained in step (i) was heat treated at about 500° C., put in 1M hydrogen fluoride, and the solution thus obtained was mixed and stirred to etch the powder for 1 hour. Then, the powder was sufficiently washed and filtered. The filtered product was dried in a drying furnace at 100° C. for 2 hours to obtain a porous silicon-based anode active material which included a core part including Si and $TiSi_2$; and a shell part including Si and a plurality of pores on the core part.

Physical properties of the porous silicon-based anode active material of Example 1 are presented in Table 1.

Examples 2 to 6

Porous silicon-based anode active materials listed in Table 1 were prepared in the same manner as in Example 1 except that the Si—TiSi$_2$ alloy powder obtained in step (i) of Example 1 was subjected to conditions listed in Table 1 below.

Example 7

Step (i): Preparing Si-M$_x$Si$_y$ Alloy Powder Using Metal (M) and Si 24 mol % of high purity Ti powder and 76 mol % of Si were used, and the powders and balls were charged into a SPEX mill filled with Ar and were milled for 15 hours to prepare Si—TiSi$_2$ alloy powder.

Step (ii): Obtaining Porous Silicon-Based Particles by Removing TiSi$_2$ Through Etching by Mixing and Stirring the Si—TiSi$_2$ Alloy Powder with Etching Solution The Si—TiSi$_2$ alloy powder obtained in step (i) was heat treated at about 800° C., put in 1M hydrogen fluoride, and the solution thus obtained was mixed and stirred to etch the powder for 1 hour. Then, the powder was sufficiently washed and filtered. The filtered product was dried in a drying furnace at 100° C. for 2 hours to obtain a porous silicon-based anode active material which included a core part including Si and TiSi$_2$; and a shell part including Si and a plurality of pores on the core part.

Step (iii): Forming Carbon Coating Layer on Surfaces of Porous Silicon-Based Particles The porous silicon-based particles and a sucrose solution were mixed at a ratio of 65:45 parts by weight to disperse the porous silicon-based particles in the sucrose solution, and the dispersed porous silicon-based particles were heat treated at 500° C. for 3 hours in an argon atmosphere to obtain an anode active material. In this case, the amount of carbon included in the coating layer was about 25 wt % based on a total weight of the anode active material, and the carbon coating layer had a thickness of about 100 nm.

Comparative Example 1

A porous silicon-based anode active material listed in Table 1 was prepared in the same manner as in Example 1 except that the Si—TiSi$_2$ alloy powder obtained in step (i) of Example 1 was subjected to a condition listed in Table 1 below.

Comparative Example 2

Si—TiSi$_2$ alloy powder was obtained in the same manner as in Example 1 except that step (ii) of Example 1 was not performed.

Comparative Examples 3 and 4

Porous silicon-based anode active materials listed in Table 1 were prepared in the same manner as in Example 1 except that the Si—TiSi$_2$ alloy powder obtained in step (i) of Example 1 was subjected to conditions listed in Table 1 below.

TABLE 1

| Example | HF concentration | Heat treatment (° C.) | Etching time | Average diameter of pore (μm) | Core part:shell part (volume ratio) | Internal porosity (%) |
|---|---|---|---|---|---|---|
| Example 1 | 1M | 500° C. | 1 hour | 0.02 | 1:2.5 | 43 |
| Example 2 | 1M | 600° C. | 1 hour | 0.05 | 1:2.4 | 45 |
| Example 3 | 1M | 700° C. | 1 hour | 0.2 | 1:2.5 | 41 |
| Example 4 | 1M | 800° C. | 1 hour | 1 | 1:2.7 | 39 |
| Example 5 | 1M | 500° C. | 8 hours | 0.02 | 1:9.8 | 58 |
| Example 6 | 5M | 500° C. | 2 hours | 0.02 | 1:8.7 | 61 |
| Example 7 (carbon coating layer) | 1M | 800° C. | 1 hour | 1 | 1:2.7 | 39 |
| Comparative Example 1 | 5M | 500° C. | 24 hours | 0.02 | 0:1 | 76 |
| Comparative Example 2 | — | 500° C. | — | — | 1:0 | 0 |
| Comparative Example 3 | 1M | 500° C. | 10 minutes | 0.02 | 1:0.5 | 13 |
| Comparative Example 4 | 5M | 500° C. | 20 hours | 0.22 | 1:22 | 72 |

<Preparation of Lithium Secondary Battery>

Example 8

In order to obtain an anode capacity of 800 mAh/g, the porous silicon-based anode active material prepared in Example 1 and spherical natural graphite having a diameter of about 15 μm were mixed and used as an anode active material. The anode active material, acetylene black as a conductive agent, and lithium-polyacrylate (Li-PAA) as a binder were mixed at a weight ratio of 90:3:7 and the mixture was mixed with distilled water as a solvent to prepare a slurry. One surface of a copper current collector was coated with the prepared slurry to a thickness of 30 μm, dried and rolled to an electrode density of 1.6 g/cc. Then, an anode was prepared by punching into a predetermined size.

A non-aqueous electrolyte solution was prepared by adding 10 wt % of fluoroethylene carbonate based on a total amount of the electrolyte solution to a mixed solvent including 1.0 M LiPF$_6$ and an organic solvent which was prepared by mixing ethylene carbonate and diethyl carbonate at a weight ratio of 30:70.

A lithium foil was used as a counter electrode, a polyolefin separator was disposed between both electrodes, and a coin-type half cell was then prepared by injecting the electrolyte solution.

Examples 9 to 14

Coin-type half cells were prepared in the same manner as in Example 8 except that the porous silicon-based anode active materials prepared in Examples 2 to 7 were respectively used instead of using the porous silicon-based anode active material prepared in Example 1.

Comparative Example 5

A coin-type half cell was prepared in the same manner as in Example 8 except that the porous silicon-based anode active material prepared in Comparative Example 1 was used instead of using the porous silicon-based anode active material prepared in Example 1.

Comparative Examples 6 to 8

Coin-type half cells were prepared in the same manner as in Example 8 except that the porous silicon-based anode active materials prepared in Comparative Examples 2 to 4 were respectively used instead of using the porous silicon-based anode active material prepared in Example 1.

Experimental Example 1

X-ray Diffraction Analysis

Figure 2:
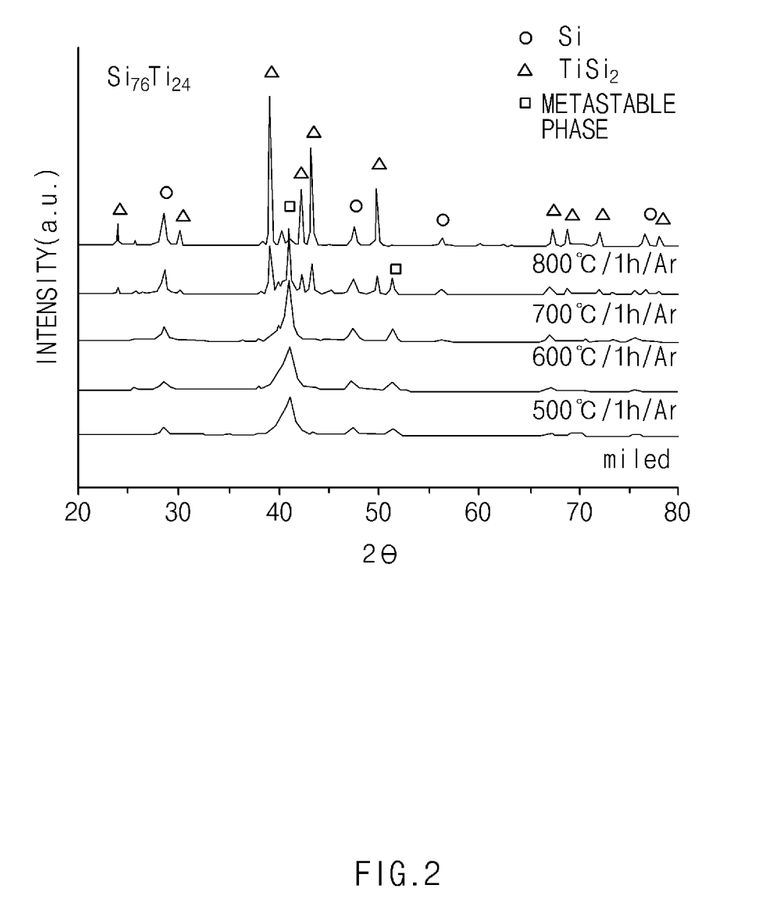
FIG. 2 illustrates the results of X-ray diffraction analysis of a porous silicon-based anode active material depending on a heat treatment temperature, according to an embodiment of the present invention.

X-ray diffraction analysis was performed on the anode active materials obtained in Examples 1 to 4 using Cu-Kα radiation, and the results thereof are presented in FIG. 2.

As illustrated in FIG. 2, in order to investigate phases formed in the anode active materials of Examples 1 to 4, Si$_{76}$Ti$_{24}$ was prepared as a comparative sample by quantitatively mixing Si and Ti, and the prepared Si$_{76}$Ti$_{24}$ was mechanically milled to obtain a comparative sample.

As a result of comparing with the prepared comparative sample, it may be confirmed that both Si phase and TiSi$_2$ phase were present in all of the anode active materials of Examples 1 to 4.

Also, it may be understood that the higher the heat treatment temperature was, the stronger and sharper the peak intensity of TiSi$_2$ was. That is, it may be understood that with respect to Example 4 heat treated at 800° C., peak intensities of Si and TiSi$_2$ were stronger and shaper than those of Examples 1 to 3.

<SEM Micrographs>

Figure 3:
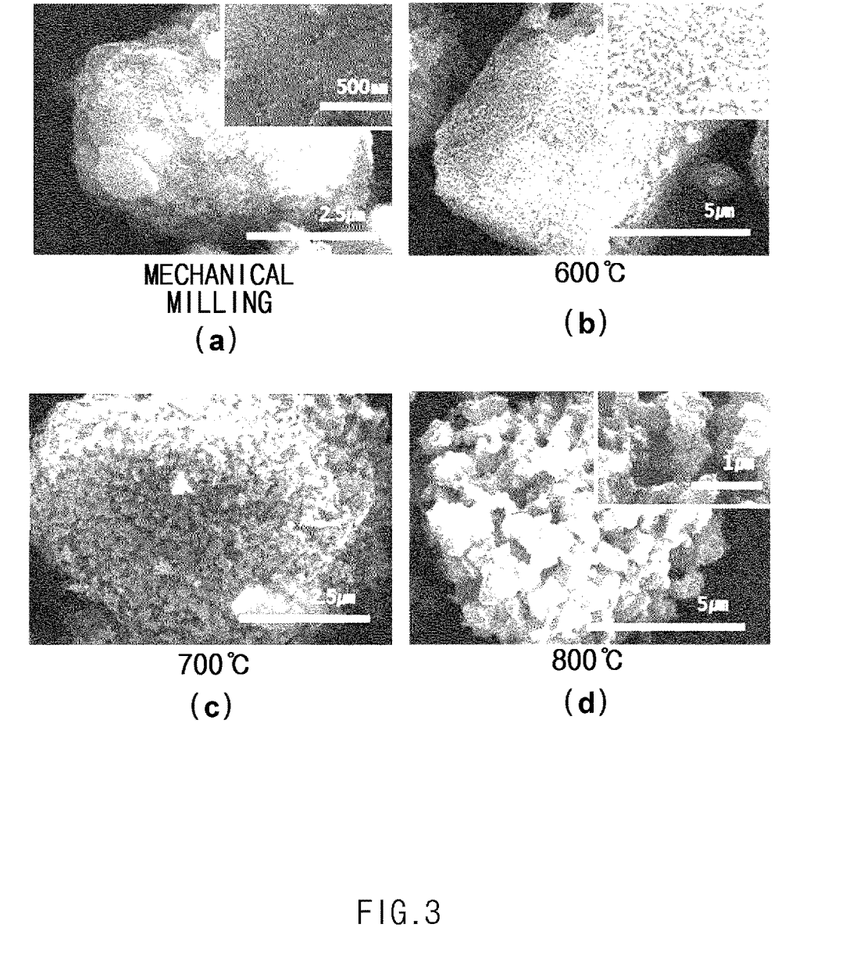
FIG. 3 illustrates surface scanning electron microscope (SEM) images of a porous silicon-based anode active material depending on a heat treatment temperature, according to an embodiment of the present invention.

The anode active materials obtained in Examples 2 to 4 were identified by SEM micrographs, and the results thereof are presented in FIG. 3.

First, in order to investigate the sizes of pores that were respectively formed in the anode active materials of Examples 2 to 4, Si$_{76}$Ti$_{24}$ was prepared as a comparative sample by quantitatively mixing Si and Ti, and the prepared Si$_{76}$Ti$_{24}$ was mechanically milled to obtain a comparative sample.

As illustrated in FIG. 3, it may be confirmed that the size of the pores formed in the shell part of the porous silicon-based anode active material may be controlled according to the heat treatment temperature of 600° C., 700° C., and 800° C.

Referring to FIG. 3, pores having a diameter of a few tens of nm or less were formed in the comparative sample (a) subjected to the mechanical milling, a diameter of pores formed in the shell part was about 0.05 µm with respect to Example 2 (b) subjected to a heat treatment at 600° C., and a diameter of pores formed in the shell part was about 0.2 µm with respect to Example 3 (c) subjected to a heat treatment at 700° C. Also, with respect to Example 4 (d) subjected to a heat treatment at 800° C., a diameter of pores formed in the shell part was about 1 µm.

Figure 4:
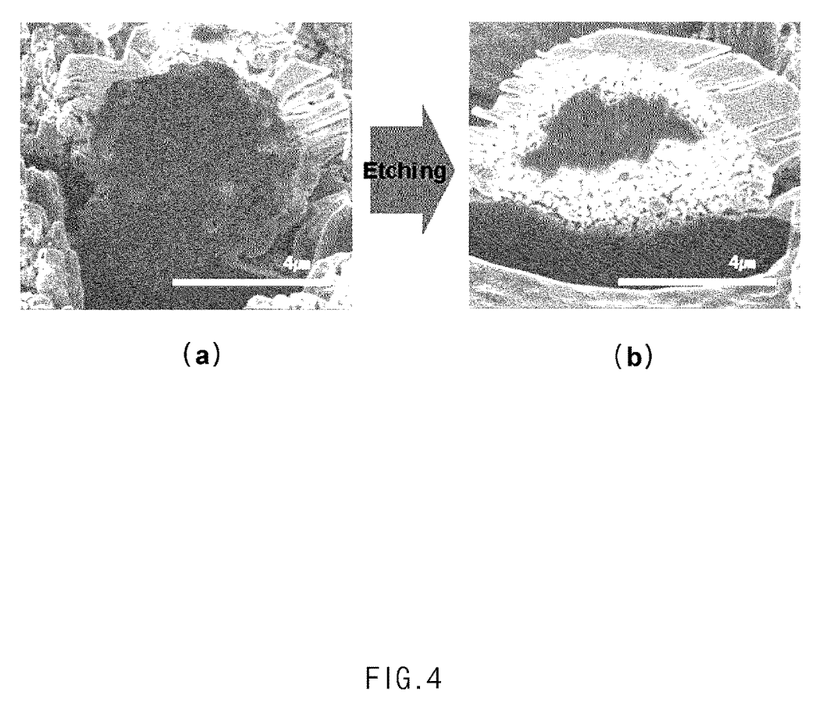
FIG. 4 illustrates cross-sectional SEM images of particles before and after etching in an anode active material according to an embodiment of the present invention.

Also, FIG. 4 illustrates cross-sectional SEM images of the anode active material prepared in Example 4.

Referring to FIG. 4, before the etching (a), an anode active material including TiSi$_2$ without pores was obtained. In contrast, it may be understood that when the etching was performed with HF (b), a core part including TiSi$_2$ without pores; and a shell part including Si and a plurality of pores formed on the core part were formed. That is, it may be confirmed that pores were formed at TiSi$_2$ sites from the surface of the anode active material and TiSi$_2$ was present as it is in the core part.

Figure 5:
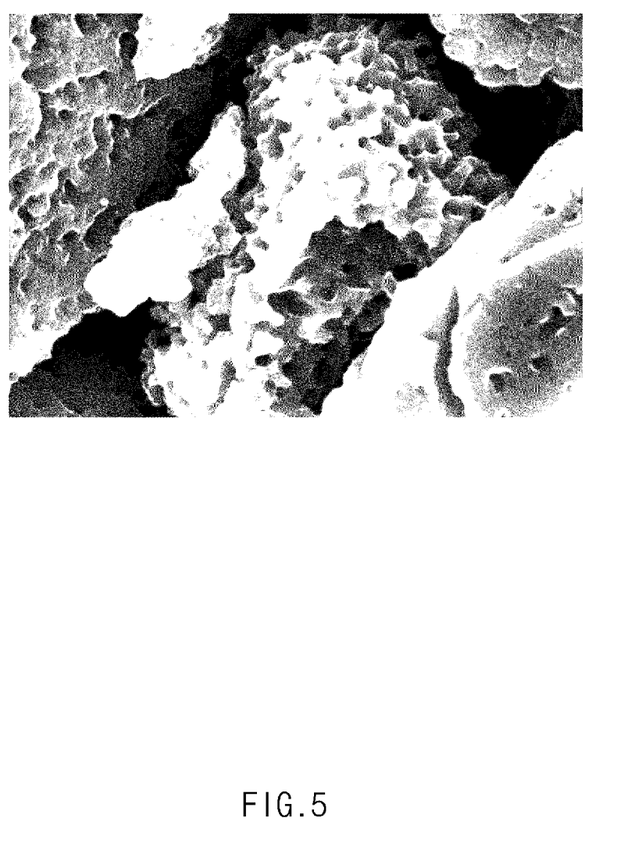
FIG. 5 illustrates a surface SEM image of an anode active material of Example 7.
Figure 6:
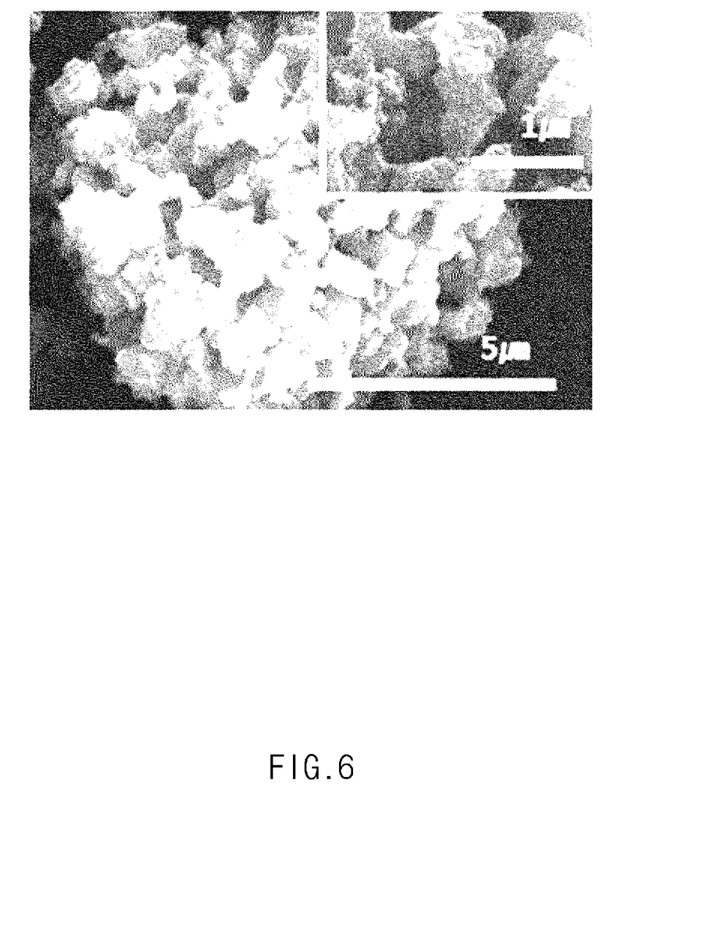
FIG. 6 illustrates surface SEM images of an anode active material of Example 4.

Also, FIGS. 5 and 6, as SEM images according to the presence of a carbon coating layer, respectively illustrate the results of SEM images of anode active materials of Example 7 and Example 4.

FIG. 5 illustrates a surface SEM image of the anode active material of Example 7 including a carbon coating layer, and FIG. 6 illustrates surface SEM images of the anode active material of Example 4 without a carbon coating layer.

As illustrated in FIG. 5, it may be confirmed that even if the carbon coating layer was formed on the surfaces of the porous silicon-based particles, the porous silicon-based particles were coated in a shape that was similar to the appearance of FIG. 6 in which a carbon coating layer was not formed. That is, it may be confirmed that since the carbon coating layer of the anode active material had a curved portion along an uneven surface of the shell part which was formed by the pores of the shell part, the appearance of the shell part was maintained.

Also, an average diameter of the pores formed in the anode active material, which was measured using SEM images, was about 1 µm as measured on the surface thereof.

<Energy Dispersive Spectroscopy (EDS) Analysis>

Figure 7:
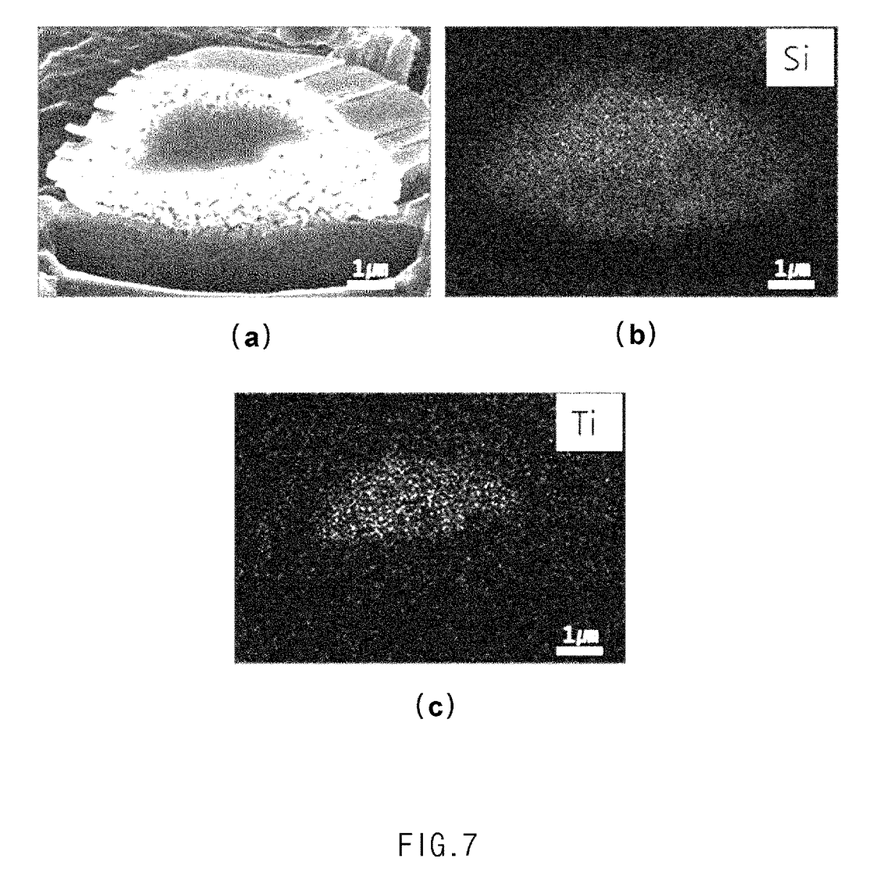
FIG. 7 illustrates energy dispersive spectroscopy (EDS) images which analyze the degree of the distribution of silicon (Si) and titanium (Ti) in the anode active material according to the embodiment of the present invention.

EDS was performed to analyze the degree of the distribution of Si and metal (Ti) of the anode active material prepared in Example 1, and the results thereof are presented in FIG. 7.

Referring to FIG. 7, FIG. 7(a) illustrates an SEM image of the anode active material which includes a core part including TiSi$_2$; and a shell part including Si and a plurality of pores on the core part, and FIGS. 7(b) and 7(c) respectively illustrate the results of EDS analysis on Si and Ti.

As illustrated in FIGS. 7(b) and 7(c), it may be confirmed that only Si was detected in the shell part, and both Si and Ti were detected in the core part. Thus, it may be understood that the shell part was formed of Si including pores, and it may confirmed that the core part was formed of Si and TiSi$_2$.

Experimental Example 2: Capacity Characteristics

In order to investigate capacity characteristics according to a voltage level (V) and capacity characteristics according to charge and discharge cycles of the lithium secondary batteries prepared in Examples 8 and 11 to 14 and Comparative Examples 5 to 8, the lithium secondary batteries prepared in Examples 8 and 11 to 14 and Comparative Examples 5 to 8 were charged at 0.1 C to a voltage of 5 mV under a constant current (CC) condition and charged to a current of 0.005 C at 5 mV under a constant voltage (CV) condition at 23° C., and then discharged at 0.1 C to a voltage of 1.5 V under a constant current (CC) condition to measure capacities. This charge and discharge cycle was repeated 1 to 49 times. The results thereof are presented in Table 2 below.

Experimental Example 3: Lifetime Characteristics and Thickness Change Rate Measurements Life characteristics of the lithium secondary batteries prepared in Examples 8 and 11 to 14 and Comparative Examples 5 to 8 were measured, and the life characteristics of each battery were represented as a ratio of discharge capacity in a 49th cycle to the first cycle discharge capacity. Each secondary battery was disassembled in a charge state of a 50th cycle and a thickness of an electrode was measured. Then, a thickness change rate was obtained by comparing the above thickness with a thickness of the electrode before the first cycle. The results thereof are presented in Table 2 below.

TABLE 2

| Examples Secondary battery (active material) | Core part: Shell part | Capacity | Lifetime characteristics (%) | Thickness change rate (%) |
|---|---|---|---|---|
| Example 8 (Example 1) | 1:2.5(1M, 500° C., 1 hr) | 799 | 83 | 117 |
| Example 11 (Example 4) | 1:2.7(1M, 800° C., 1 hr) | 802 | 82 | 113 |
| Example 12 (Example 5) | 1:9.8(1M, 500° C., 8 hrs) | 801 | 88 | 109 |
| Example 13 (Example 6) | 1:8.7(5M, 500° C., 2 hrs) | 797 | 86 | 110 |
| Example 14 (Example 7) | 1:2.7(1M, 800° C., 1 hr) | 805 | 89 | 108 |
| Comparative Example 5 (Comparative Example 1) | 0:1(5M, 500° C., 24 hrs) | 801 | 69 | 145 |
| Comparative Example 6 (Comparative Example 2) | 1:0 — | 803 | 73 | 152 |
| Comparative Example 7 (Comparative Example 3) | 1:0.5(1M, 500° C., 10 hrs) | 796 | 75 | 151 |
| Comparative Example 8 (Comparative Example 4) | 1:22(1M, 500° C., 20 hrs) | 799 | 70 | 147 |

Lifetime characteristics: (discharge capacity in a 49th cycle/discharge capacity in the first cycle)×100

Thickness change rate: (electrode thickness in a charge state of a 50th cycle−electrode thickness before a first cycle)/electrode thickness before the first cycle×100

As illustrated in Table 2, it may be confirmed that the lithium secondary batteries of Examples 8 and 11 to 14 of the present invention had significantly better lifetime characteristics and significantly lower thickness change rates while exhibiting capacity characteristics that were the same as or better than those of Comparative Examples 5 to 8.

Specifically, it may be confirmed that the lifetime characteristics of Examples 8 and 11 to 14, in which anode active materials having a ratio of the core part to the shell part of 1:2.5 to 1:9.8 were used, were improved by about 10% or more in comparison to Comparative Examples 5 to 8 using the anode active materials in which the ratio of the core part to the shell part is outside the range of 1:1 to 1:20, and the thickness change rates of Examples 8 and 11 to 14 were decreased by 30% to 50%.

Thus, since the anode active material included Si and the plurality of pores in the shell part, the volume expansion of the anode active material during charge and discharge may be minimized due to the pores. As a result, it may be understood that the lifetime characteristics were improved. In addition, since the core part included Si and $TiSi_2$ to support porous Si, it may be estimated that more stable lifetime characteristics may be secured.

Also, as illustrated in Table 2, it may be confirmed that the lithium secondary battery of Example 14, in which the anode active material including a carbon coating layer was used, had significantly better capacity characteristics and lifetime characteristics than Example 11 using the anode active material in which a carbon coating layer was not included.

Specifically, it may be confirmed that the capacity and lifetime of the lithium secondary battery of Example 14 using the anode active material of Example 7, in which a carbon coating layer was included, were respectively increased by about 3 mAh capacity characteristics and about 7% lifetime characteristics in comparison to those of the lithium secondary battery of Example 11 using the anode active material of Example 4 in which a carbon coating layer was not included.

INDUSTRIAL APPLICABILITY

According to an embodiment of the present invention, the performance of a lithium secondary battery may be further improved by minimizing the volume expansion of an anode active material during charge and discharge and providing improved mechanical properties as well as excellent electrical conductivity even after an electrode expands as the charge and discharge proceed.

The invention claimed is:

1. An anode active material comprising:
   a core part consisting of silicon (Si) and $M_xSi_y$, without pores; and
   a shell part including Si and a plurality of pores on the core part,
   wherein, in the $M_xSi_y$, M is at least one element selected from Group 2A, 3A, or 4A elements or transition metals, $1 \leq x \leq 4$, and $1 \leq y \leq 4$, and
   wherein a volume ratio of the core part to the shell part is in a range of 1:1 to 1:20.

2. The anode active material of claim 1, further comprising a carbon coating layer on the shell part,
   wherein the carbon coating layer has a curved portion along an uneven surface of the shell part which is formed by the pores of the shell part.

3. The anode active material of claim 2, wherein a thickness of the carbon coating layer is in a range of 5 nm to 500 nm.

4. The anode active material of claim 2, wherein an amount of carbon in the carbon coating layer is in a range of 2 wt % to 70 wt % based on a total weight of the anode active material.

5. The anode active material of claim 1, wherein a weight ratio of M:Si in the $M_xSi_y$ is in a range of 1:0.5 to 1:10.

6. The anode active material of claim 1, wherein M is at least one element selected from tin (Sn), aluminum (Al), lead (Pb), indium (In), nickel (Ni), cobalt (Co), silver (Ag), magnesium (Mg), copper (Cu), germanium (Ge), chromium (Cr), titanium (Ti), manganese (Mn), vanadium (V), molybdenum (Mo), or iron (Fe).

7. The anode active material of claim 1, wherein an average diameter of the pores is in a range of 10 nm to 2 μm as measured on a surface of the anode active material.

8. The anode active material of claim 1, wherein an internal porosity of the shell part is in a range of 20% to 80%.

9. The anode active material of claim 1, wherein the shell part further comprises $M_xSi_y$,
wherein M is at least one element selected from Group 2A, 3A, or 4A elements or transition metals, $1 \leq x \leq 4$, and $1 \leq y \leq 4$.

10. The anode active material of claim 1, wherein an average particle diameter ($D_{50}$) of the anode active material is in a range of 0.1 μm to 50 μm.

11. The anode active material of claim 1, wherein a specific surface area (Brunauer-Emmett-Teller (BET)-SSA) of the anode active material is in a range of 2 $m^2$/g to 80 $m^2$/g.

12. A method of preparing the anode active material of claim 1, the method comprising:
preparing Si-$M_xSi_y$ alloy powder by using metal (M) and silicon (Si); and
preparing silicon-based particles having a core part including Si and $M_xSi_x$ without pores and having a shell part including Si and a plurality of pores on the core part,
wherein the shell part is formed by removing $M_xSi_y$ from a surface of the Si-$M_xSi_y$ alloy powder through etching by mixing and stirring the Si-$M_xSi_y$ alloy powder with an etching solution,
wherein, in the $M_xSi_y$, M is at least one element selected from Group 2A, 3A, or 4A elements or transition metals, $1 \leq x \leq 4$, and $1 \leq y \leq 4$, and
wherein a volume ratio of the core part to the shell part is in a range of 1:1 to 1:20.

13. The method of claim 12, further comprising forming a carbon coating layer on surfaces of the porous silicon-based particles, after the etching.

14. The method of claim 13, wherein the carbon coating layer is formed by mixing the porous silicon-based particles with a carbon precursor and heat treating the mixture.

15. The method of claim 14, wherein the carbon precursor comprises gas including carbon, amorphous carbon, or low crystalline carbon.

16. The method of claim 15, wherein the amorphous carbon or the low crystalline carbon comprises any one selected from glucose, fructose, galactose, maltose, lactose, sucrose, a phenol-based resin, a naphthalene resin, a polyvinyl alcohol resin, an urethane resin, a polyimide resin, a furan resin, a cellulose resin, an epoxy resin, a polystyrene resin, a resorcinol-based resin, a phloroglucinol-based resin, a coal-derived pitch, a petroleum-derived pitch, a tar, or low molecular weight heavy oil, or a mixture of two or more thereof.

17. The method of claim 14, wherein the heat treatment is performed in a temperature range of 160° C. to 1,300° C.

18. The method of claim 13, wherein the carbon coating layer is formed by a method of carburizing an amorphous carbon precursor or a chemical vapor deposition (CVD) method that uses gas including carbon.

19. The method of claim 12, wherein the Si-$M_xSi_y$ alloy powder is prepared by rapid cooling an alloy melt in which metal (M) and Si are melted.

20. The method of claim 19, further comprising mechanical milling the prepared Si-$M_xSi_y$ alloy powder between the rapid cooling and the etching.

21. The method of claim 19, wherein the melting is performed in a temperature range of room temperature to 1,600° C.

22. The method of claim 19, wherein the rapid cooling is performed at a rate of $10^3$ K/sec to $10^9$ K/sec.

23. The method of claim 12, wherein the Si-$M_xSi_y$ alloy powder is prepared by mechanical milling metal (M) and Si.

24. The method of claim 12, further comprising performing a heat treatment before the etching, after the preparing of the Si-$M_xSi_y$ alloy powder.

25. The method of claim 24, wherein the heat treatment is performed in a temperature range of 500° C. to 800° C.

26. The method of claim 12, wherein the etching time is in a range of 30 minutes to 1,000 minutes.

27. The method of claim 12, wherein a concentration of the etching solution is in a range of 1M to 20 M.

28. The method of claim 12, wherein the etching solution comprises at least one solution selected from hydrogen fluoride (HF), fluorosilicic acid ($H_2SiF_6$), ammonium fluoride ($NH_4F$), hydrochloric acid, sulfuric acid, phosphoric acid or nitric acid.

29. An anode comprising the anode active material of claim 1.

30. The anode of claim 29, wherein a carbon-based material is further mixed and included in the anode active material.

31. The anode of claim 30, wherein the carbon-based material comprises at least one selected from natural graphite, artificial graphite, soft carbon, hard carbon, mesocarbon microbeads (MCMB), carbon fibers, or carbon black.

32. A lithium secondary battery comprising:
a cathode;
an anode; and
a separator disposed between the cathode and the anode,
wherein the anode is the anode of claim 29.

* * * * *